United States Patent
Chung et al.

(10) Patent No.: US 7,420,339 B2
(45) Date of Patent: Sep. 2, 2008

(54) REGENERATIVE BRAKING SYSTEM OF FUEL CELL VEHICLE USING SUPER CAPACITOR

(75) Inventors: Sung Jin Chung, Suwon-si (KR); Soon Il Jeon, Yongin-si (KR); Kyu Il Lee, Yongin-si (KR); Joon Yong Lee, Yongin-si (KR); Sang Hoon Lee, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 51 days.

(21) Appl. No.: 11/652,320

(22) Filed: Jan. 10, 2007

(65) Prior Publication Data

US 2008/0136359 A1   Jun. 12, 2008

(30) Foreign Application Priority Data

Nov. 15, 2006   (KR) .................. 10-2006-0112956

(51) Int. Cl.
*H02P 3/00* (2006.01)
*H02P 3/18* (2006.01)

(52) U.S. Cl. .................. 318/139; 318/376; 180/65.3

(58) Field of Classification Search .............. 318/139, 318/362, 375, 376; 180/65.3
See application file for complete search history.

(56) References Cited

U.S. PATENT DOCUMENTS 5,331,261 A * 7/1994 Brown et al. ............. 318/376
6,573,675 B2 * 6/2003 Schmitz et al. ............ 318/434
6,615,940 B2 * 9/2003 Morisawa .................. 180/65.1
6,941,198 B2 * 9/2005 Brigham et al. ............... 701/22
7,109,686 B2 * 9/2006 Schulte et al. .............. 320/167
2006/0061922 A1   3/2006 Mihai et al.
2008/0087479 A1 * 4/2008 Kang ....................... 180/65.3

FOREIGN PATENT DOCUMENTS

| JP | 10-051907 | 2/1998 |
|---|---|---|
| JP | 10-075502 | 3/1998 |
| JP | 2004-192826 | 7/2004 |
| JP | 2004-350478 | 12/2004 |
| KR | 2006-0003543 | 1/2006 |

* cited by examiner

*Primary Examiner*—Taghi T. Arani
*Assistant Examiner*—Thai T Dinh
(74) *Attorney, Agent, or Firm*—Morgan Lewis & Bockius LLP

(57) ABSTRACT

A regenerative braking system includes a capacitor which is electrically connected to a stack and is charged by the stack, a traction motor, a motor control unit which control electric power input to the traction motor and electric power output from the traction motor, a chopper which is connected to the capacitor so as to be ON and OFF switched thereby limiting charging voltage of the capacitor, a braking resistor which consumes regenerative energy so as to serve as an auxiliary brake, and a hybrid control unit which turns on the chopper in case that a charging voltage limit of capacitor is exceeded so as to control overcharge of the capacitor and turns off the chopper in case that charging voltage of the capacitor descends. The capacitor is preferably a super capacitor.

5 Claims, 4 Drawing Sheets

[FIG.1]
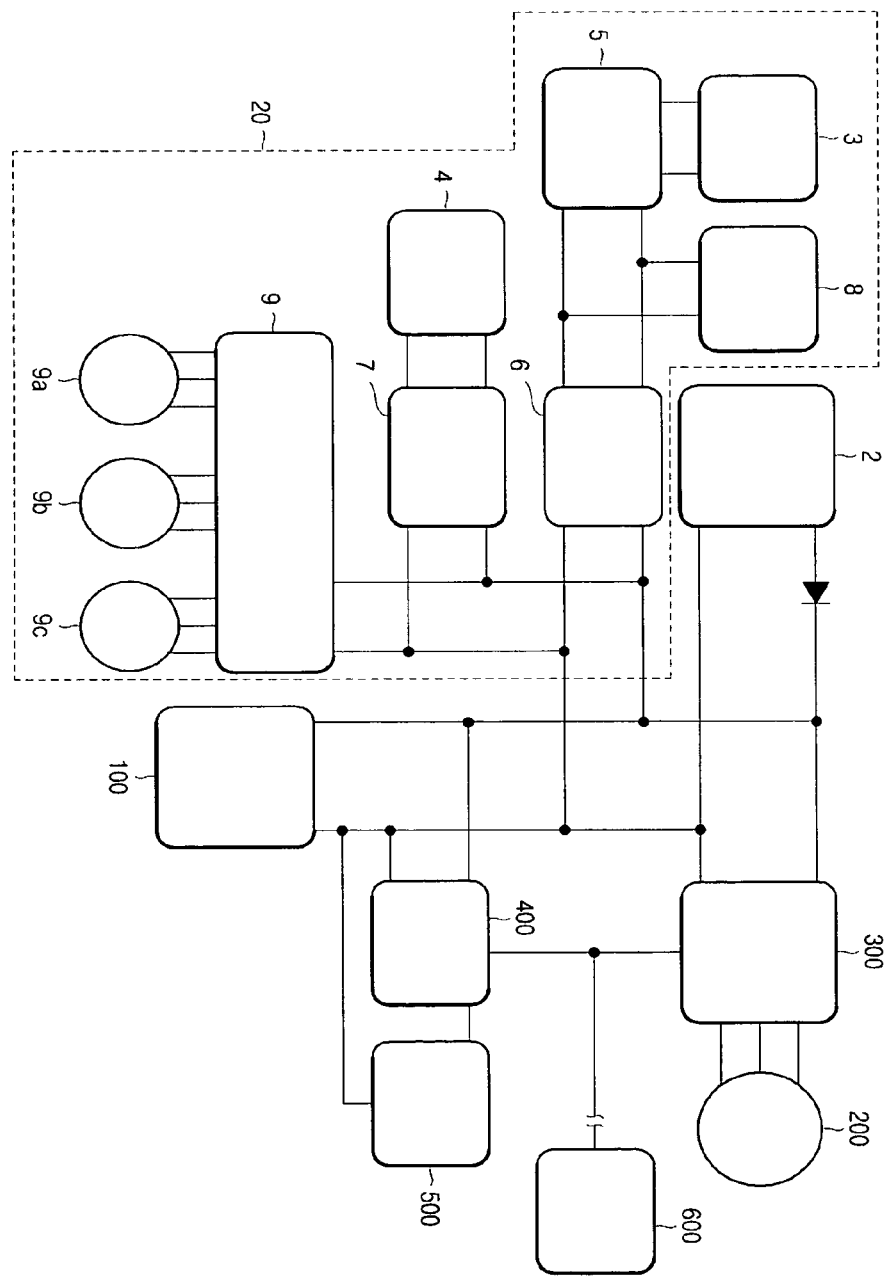

[FIG. 2A]
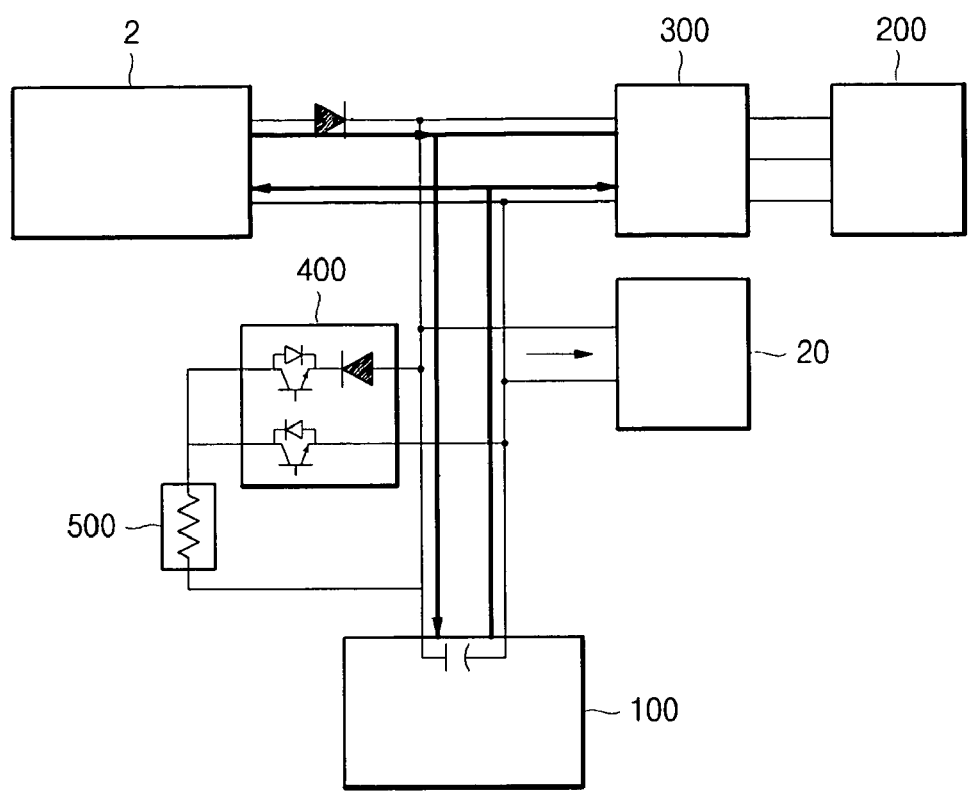

【FIG. 2B】
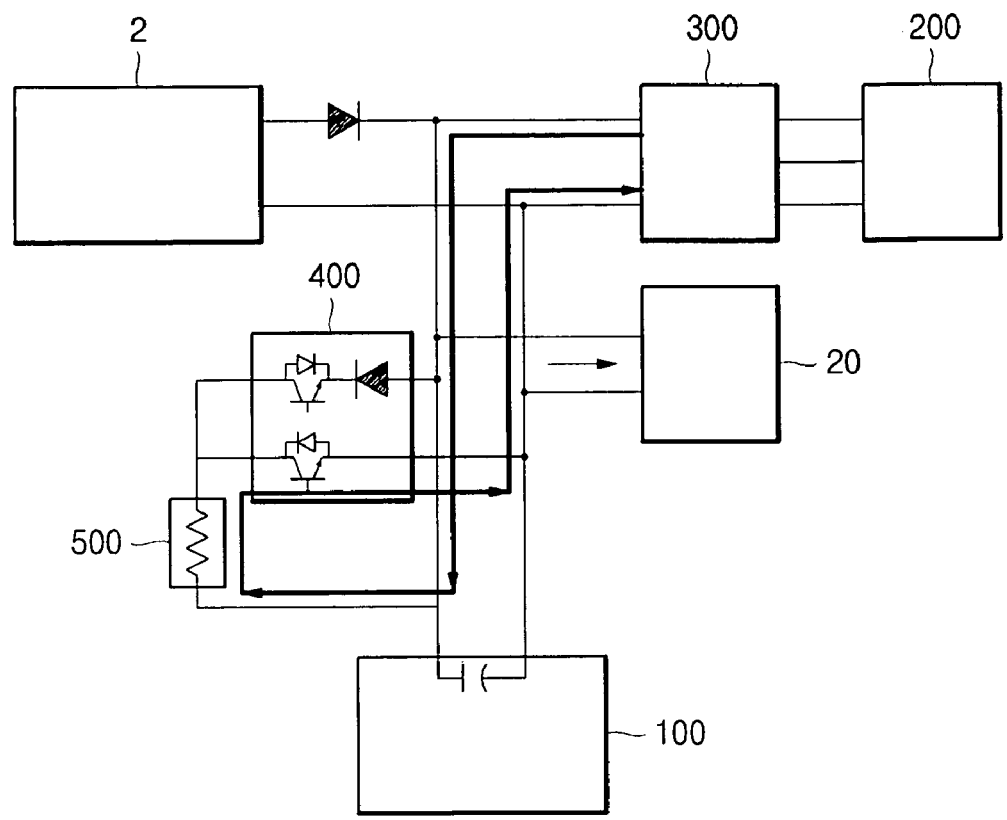
【FIG. 3】
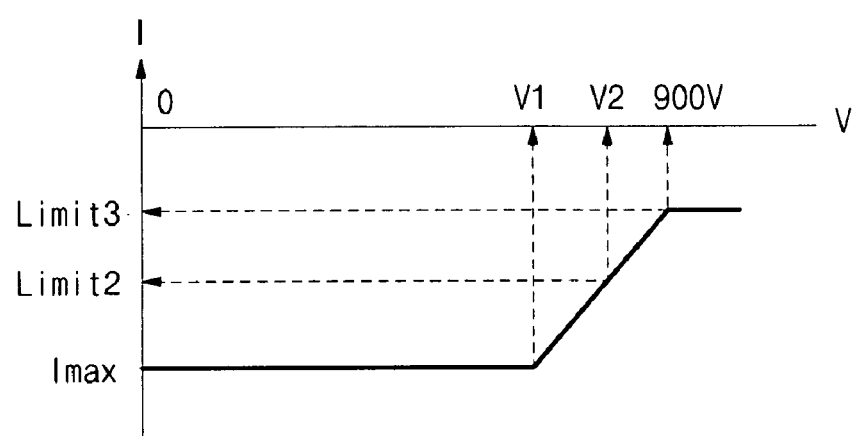

[FIG. 4]
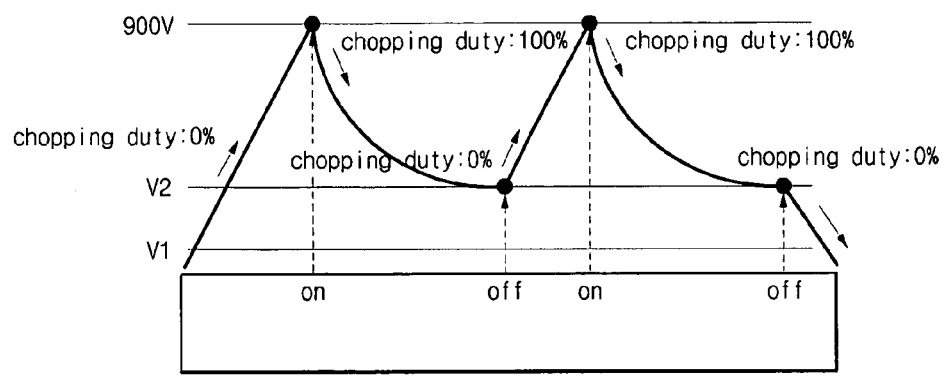
[FIG. 5]
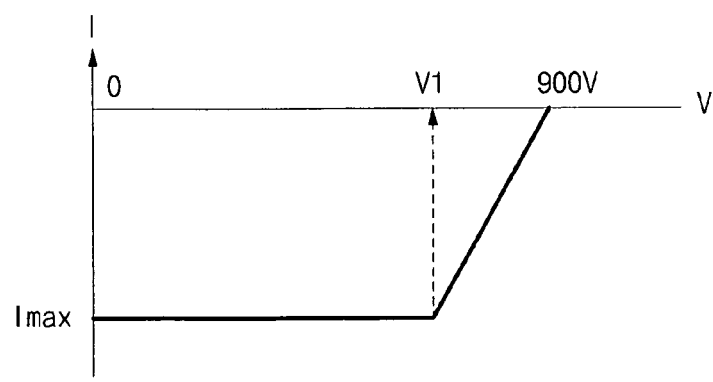

REGENERATIVE BRAKING SYSTEM OF FUEL CELL VEHICLE USING SUPER CAPACITOR

CROSS-REFERENCE TO RELATED APPLICATION

This application claims priority to and the benefit of Korean Patent Application No. 10-2006-0112956 filed in the Korean Intellectual Property Office on Nov. 15, 2006, the entire contents of which are incorporated herein by reference.

BACKGROUND OF THE INVENTION (a) Field of the Invention

The present invention relates to a regenerative braking system for a fuel cell vehicle and, more particularly, such a braking system using a super capacitor.

(b) Description of the Related Art

Generally, a fuel cell includes electrodes where electrochemical reaction occurs, an electrolyte membrane transmitting hydrogen ions generated by the reaction, and a separator supporting the electrodes and the electrolyte membrane. A polymer electrolyte fuel cell is widely used as a fuel cell for a vehicle. The polymer electrolyte fuel cell is a device generating electricity while generating water and heat through electrochemical reaction between hydrogen and oxygen.

The polymer electrolyte fuel cell has a better efficiency, greater current density and output density, and shorter starting time than fuel cells of other types. It is also free from corrosion and does not need to regulate the electrolyte. Furthermore, the polymer electrolyte fuel cell is a green power source that exhausts pure water, so various research regarding the same is being made in the field of an automotive engineering.

Recently, a super capacitor has been explained for fuel cell vehicles in addition to a battery. The super capacitor is charged while a vehicle runs, and the super capacitor serves to supplement power of a fuel cell stack.

The super capacitor assists power during acceleration of a vehicle and stores regenerative braking energy while applying brake. The super capacitor should be suitably charged and discharged so as to supplement operation of a fuel cell vehicle, and overcharge of the super capacitor may cause problem in an overall system of a fuel cell vehicle. In particular, in case that a fuel cell vehicle having the super capacitor is repeatedly braked while driving a downhill, there is a problem in that the brake may be overloaded and the super capacitor may be overcharged.

SUMMARY OF THE INVENTION

Embodiments of the present invention provide a regenerative braking system for a fuel cell vehicle using a super capacitor having an advantage of preventing overcharge of the super capacitor so as to enhancing braking performance and energy storage efficiency.

An exemplary embodiment of the present invention provides a regenerative braking system including a capacitor which is electrically connected to a stack of a fuel cell vehicle and is charged by the stack; a traction motor which is supplied with electric power from the stack or from both the stack and the capacitor so as to drive the fuel cell vehicle and supplies electric power generated by regenerative braking to the super capacitor; a motor control unit which controls electric power input to the traction motor and electric power output from the traction motor; a chopper which is connected to the capacitor so as to be ON and OFF switched when braking of the fuel cell vehicle is performed on a level load or a downhill thereby limiting charging voltage of the capacitor; a braking resistor which is connected to the chopper and the capacitor and consumes regenerative energy generated by a traction motor while the fuel cell vehicle is braked as heat using a resistor so as to serve as an auxiliary brake; and a hybrid control unit which turns on the chopper in case that a charging voltage limit which can be stored to the capacitor is exceeded so as to control overcharge of the capacitor and turns off the chopper in case that charging voltage of the capacitor descends.

Preferably, the capacity is a super capacitor. The hybrid control unit may control such that the super capacitor is charged with DC voltage of 900V which is generated in the fuel cell stack.

The hybrid control unit may control the chopper to be turned on when charging voltage of the super capacitor reaches 900V such that current is supplied from the traction motor via the braking resistor, and may control the chopper to be turned off when voltage of the super capacitor is less than 900V such that the super capacitor is charged.

The chopper may be configured such that the motor control unit is controlled by the hybrid control unit at normal operation or occurrence of disorder.

BRIEF DESCRIPTION OF THE DRAWINGS

FIG. 1 is a schematic diagram of regenerative braking system of a fuel cell vehicle using a capacitor according to an exemplary embodiment of the present invention.

FIG. 2A and FIG. 2B are schematic diagrams showing operating states of a regenerative braking system of a fuel cell vehicle using a capacitor according to an exemplary embodiment of the present invention.

FIG. 3 is a graph of current limit by a hybrid control unit in a regenerative braking system of a fuel cell vehicle using a capacitor according to an exemplary embodiment of the present invention.

FIG. 4 is a drawing showing voltage characteristic by a chopper in a regenerative braking system of a fuel cell vehicle using a capacitor according to an exemplary embodiment of the present invention.

FIG. 5 is a graph of current limit when a chopper is out of order in a regenerative braking system of a fuel cell vehicle using a capacitor according to an exemplary embodiment of the present invention.

DETAILED DESCRIPTION OF THE EMBODIMENTS

Exemplary embodiments of the present invention will hereinafter be described in detail with reference to the accompanying drawings.

Referring to FIG. 1 to FIG. 4, a regenerative braking system of a fuel cell vehicle according to an exemplary embodiment of the present invention includes: a capacitor 100 which is electrically connected to a stack 2 of a fuel cell vehicle and is charged by the stack 2; a traction motor 200 which is supplied with electric power from the stack 2 or from both the stack 2 and the capacitor 100 so as to drive the fuel cell vehicle and supplies electric power generated by regenerative braking to the capacitor 100; a motor control unit 300 which control electric power input to the traction motor 200 and electric power output from the traction motor 200; a chopper 400 which is connected to the capacitor 100 so as to be ON and OFF switched when braking of the fuel cell vehicle is performed on a level load or a downhill thereby limiting charging voltage of the capacitor 100; a braking resistor 500 which is connected to the chopper 400 and the capacitor 100 and consumes regenerative energy generated by a traction motor while the fuel cell vehicle is braked as heat using a resistor so as to serve as an auxiliary brake; and a hybrid control unit 600 which turns on the chopper 400 in case that a charging voltage limit which can be stored to the capacitor 100 is exceeded so as to control overcharge of the super capacitor 100 and turns off the chopper 400 in case that charging voltage of the capacitor 100 descends.

In a preferred embodiment, capacitor 100 comprises a super capacitor.

In addition, a 12V auxiliary battery 3 and a 24V auxiliary battery 4 for driving 12V electric parts (not shown) and 24V electric parts (not shown) of a fuel cell vehicle respectively may be provided. The 12V auxiliary battery 3 is a low voltage battery which is mounted to a small passenger vehicle, and the 24V auxiliary battery 4 is a low voltage battery which is mounted to an internal combustion engine bus. The 12V auxiliary battery 3 is connected to a first DC/DC converter 5, the first DC/DC converter 5 is connected to a high voltage DC/DC converter 6, and the 24V auxiliary battery 4 is connected to a second DC/DC converter 7. A water pump 9a, a power steering pump 9b, and an air conditioner compressor 9c are respectively connected to an inverter 9 which changes electric power of the stack 2. Reference numeral 20 denotes a parasitic load.

The hybrid control unit 600 controls such that the super capacitor 100 is charged by energy generated by the stack 2 of a fuel cell and regenerative braking energy of the traction motor. The hybrid control unit 600 controls the chopper 400 to be turned on when charging voltage of the super capacitor 100 reaches 900V such that current is supplied from the traction motor 200 via the braking resistor 500, and controls the chopper 400 to be turned off when voltage of the super capacitor 100 is less than 900V such that the super capacitor 100 is charged. The chopper 400 is configured such that the motor control unit 300 is controlled by the hybrid control unit 600 at normal operation or occurrence of disorder.

The control units utilized in connection with embodiments of the present invention each may comprise a processor, memory and associated hardware and software as may be selected and programmed by persons of ordinary skill in the art based on the teachings contained herein. Alternatively, as will be appreciated by persons skilled in the art, certain logic functions may be combined in common hardware as appropriate.

Operating states of a regenerative braking system of a fuel cell vehicle using a super capacitor according to an exemplary embodiment of the present invention will be explained with reference to the drawings.

Referring to FIG. 1 and FIG. 2A, while a fuel cell vehicle runs on a level road, voltage generated in the stack 2 is transmitted to the traction motor 200 so that the traction motor 200 operates, and the super capacitor 100 which is electrically connected to the stack 2 assists the stack 2 during charge or acceleration.

The hybrid control unit 600 controls the super capacitor 100 to be charged during regenerative braking when charging voltage stored in the super capacitor 100 is less than 900V, and the stack 2 and the super capacitor 100 supplies electric power needed for the parasitic load 20 so as to make the fuel cell vehicle smoothly run.

A state in which the fuel cell vehicle runs on a downhill will be explained with reference to the drawings.

Referring to FIG. 1 to FIG. 3, braking of a fuel cell vehicle which is provided with the stack 2 and the super capacitor 100 may be repeatedly applied while the fuel cell vehicle runs on a downhill.

If braking is repeatedly applied as such, the hybrid control unit 600 transmits current limit command to the motor control unit 300 so that regenerative energy which cannot be stored in the super capacitor 100 is consumed as heat using the braking resistor 500 which is provided to the chopper 400 so as to serve as an auxiliary brake. At this time, the braking resistor 500 is Ahm, and current of 900V/Ahm=Limit3A can be consumed by the braking resistor 500 according to Ohm's law.

Current passing through the braking resistor 500 is transmitted to the motor control unit 300 through the chopper 400 so as to be delivered to the traction motor 200. As described above, while the chopper 400 and the braking resistor 500 are controlled by the hybrid control unit 600, regenerative current of ImaxA is stored until voltage of the super capacitor 100 becomes V1, and current limit value is decreased more than that current for the stability of a vehicle and it becomes Limit3A at 900V.

Referring to FIG. 4, regenerative braking characteristic by the chopper 400 and the braking resistor 500 will be explained. If charge voltage of the super capacitor 100 approaches 900V after passing through V1, the chopper 400 is turned on so that current of Limit3A instantaneously flows a resistor which is installed to the braking resistor 500 so that charge voltage of the super capacitor 100 instantaneously descends, and since it is important to maintain charge voltage of the super capacitor 100 in terms of energy storage as well as braking of a fuel cell vehicle, the chopper 400 is turned off at V2 so as to prevent loss of current by the braking resistor 500.

If braking is continuously applied, charge voltage of the super capacitor 100 again increases to 900V so that the chopper 400 is again turned on so as to prevent overcharge of the super capacitor 100 and to maintain function of an auxiliary brake using the braking resistor 500.

When braking is repeatedly applied while a fuel cell vehicle runs on a downhill, on/off control of the chopper 400 is repeated by the hybrid control unit 600 so as to prevent overcharge of the super capacitor 100, and if braking is terminated, voltage of the super capacitor 100 becomes less than V2, so the chopper 400 is turned off so that the braking resistor 500 does not operate any more and the super capacitor 100 is charged.

Referring to FIG. 5, if disorder of the chopper 400 occurs, the auxiliary brake function by the brake resistance during braking of a vehicle, so the hybrid control unit 600 controls the motor control unit 300 such that charge voltage of the super capacitor 100 does not reach 900V by actively changing current limit of regenerative braking for stability of a system. If voltage of the super capacitor 100 becomes 900V, current of regenerative braking becomes 0 A, so regeneration is not performed any more.

While embodiments of this invention have been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

As described above, in a regenerative braking system of a fuel cell vehicle according to an exemplary embodiment of the present invention, energy is stored in the super capacitor by regenerative current, so that energy storage and role of an auxiliary brake can be performed by the control of the chopper.

Furthermore, overcharge of the super capacitor is prevented so as to prevent span of life of the super capacitor from being shortened and to prevent damage of the super capacitor, thereby realizing stable driving of a fuel cell vehicle.

What is claimed is:

1. A regenerative braking system, comprising:
   a capacitor electrically connected to a stack of a fuel cell vehicle and configured to be charged by the stack;
   a traction motor supplied with electric power from the stack or from both the stack and the capacitor so as to drive the fuel cell vehicle and which supplies electric power generated by regenerative braking to the capacitor;
   a motor control unit that controls electric power input to the traction motor and electric power output from the traction motor;
   a chopper connected to the capacitor so as to be ON and OFF switched when braking of the fuel cell vehicle is performed on a level load or a downhill thereby limiting charging voltage of the capacitor;
   a braking resistor which is connected to the chopper and the capacitor and consumes regenerative energy generated by a traction motor while the fuel cell vehicle is braked as heat using a resistor so as to serve as an auxiliary brake; and
   a hybrid control unit which turns on the chopper in case that a charging voltage limit which can be stored to the capacitor is exceeded so as to control overcharge of the capacitor and turns off the chopper in case that charging voltage of the capacitor descends.

2. The regenerative braking system of claim 1, wherein the capacitor comprises a super capacitor.

3. The regenerative braking system of claim 2, wherein the hybrid control unit controls such that the super capacitor is charged with DC voltage of 900V which is generated in the fuel cell stack.

4. The regenerative braking system of claim 2, wherein the hybrid control unit controls the chopper to be turned on when charging voltage of the super capacitor reaches 900V such that current is supplied from the traction motor via the braking resistor, and controls the chopper to be turned off when voltage of the super capacitor is less than 900V such that the super capacitor is charged.

5. The regenerative braking system of claim 2, wherein the chopper is configured such that the motor control unit is controlled by the hybrid control unit at normal operation or occurrence of disorder.

* * * * *